(12) United States Patent
Kojima et al.

(10) Patent No.: US 8,310,392 B2
(45) Date of Patent: Nov. 13, 2012

(54) RADAR DEVICE AND ECHO DATA PROCESSING DEVICE

(75) Inventors: Tatsuya Kojima, Nishinomiya (JP); Takumi Fujikawa, Nishinomiya (JP); Hidetoshi Kaida, Nishinomiya (JP); Yu Morita, Nishinomiya (JP); Toshiaki Takaki, Nishinomiya (JP); Katsunori Okamatu, Nishinomiya (JP)

(73) Assignee: Furuno Electric Company, Limited, Nishinomiya (JP)

( * ) Notice: Subject to any disclaimer, the term of this patent is extended or adjusted under 35 U.S.C. 154(b) by 309 days.

(21) Appl. No.: 12/713,615

(22) Filed: Feb. 26, 2010

(65) Prior Publication Data

US 2010/0214151 A1  Aug. 26, 2010

(30) Foreign Application Priority Data

Feb. 26, 2009  (JP) .................... 2009-043444

(51) Int. Cl.
*G01S 7/298* (2006.01)
*G01S 13/89* (2006.01)
*G01S 7/00* (2006.01)
*G01S 13/00* (2006.01)

(52) U.S. Cl. .............. 342/185; 342/89; 342/90; 342/91; 342/93; 342/159; 342/160; 342/162; 342/175; 342/176; 342/179; 342/181; 342/195

(58) Field of Classification Search .............. 342/27, 342/28, 89–95, 159–164, 175, 176, 179–186, 342/194–197, 26 R–26 D
See application file for complete search history.

(56) References Cited

U.S. PATENT DOCUMENTS

| | | | |
|---|---|---|---|
| 3,778,827 A * | 12/1973 | Strenglein | 342/95 |
| 3,806,929 A * | 4/1974 | Moore | 342/90 |
| 3,831,174 A * | 8/1974 | King et al. | 342/90 |
| 4,780,720 A * | 10/1988 | Watts | 342/91 |
| 4,928,131 A * | 5/1990 | Onozawa | 342/159 |
| 4,933,678 A * | 6/1990 | Tennyson | 342/176 |
| 5,227,801 A * | 7/1993 | Pierce | 342/196 |
| 5,351,055 A * | 9/1994 | Fujikawa et al. | 342/184 |
| 5,546,084 A * | 8/1996 | Hindman | 342/161 |
| 5,805,106 A * | 9/1998 | Baum | 342/159 |
| 6,337,654 B1 * | 1/2002 | Richardson et al. | 342/90 |
| 6,437,728 B1 * | 8/2002 | Richardson et al. | 342/90 |
| 6,617,998 B1 * | 9/2003 | Cook et al. | 342/90 |
| 7,916,068 B2 * | 3/2011 | Wicks et al. | 342/162 |

FOREIGN PATENT DOCUMENTS

DE   101 16 277 A1   10/2002

(Continued)

*Primary Examiner* — Bernarr Gregory

(74) *Attorney, Agent, or Firm* — Birch, Stewart, Kolasch & Birch, LLP

(57) ABSTRACT

A radar device includes an antenna, from which a detection signal is transmitted while the antenna being rotated and by which a reflective wave of the transmitted detection signal is received to detect echo data, wherein image data is generated based on the detected echo data, a continuity detecting module for detecting a planar continuity of the currently detected echo data with respect to a pixel concerned in the image data, a behavior data generating module for generating behavior data indicative of a behavior of the echo data for a predetermined number of scans of the past in the pixel concerned based on behavior determination data, and an echo kind determining module for determining a kind of the echo data of the pixel concerned based on the planar continuity and the behavior data.

20 Claims, 8 Drawing Sheets

FOREIGN PATENT DOCUMENTS

| | | |
|---|---|---|
| EP | 0 886 149 A3 | 12/1998 |
| JP | 58-053778 A | 3/1983 |
| JP | 5-027011 A | 2/1993 |
| JP | 11-304915 A | 11/1999 |
| JP | 2002-243842 A | 8/2002 |
| JP | 2009-58433 A | 3/2009 |
| JP | 2009-074839 A | 4/2009 |
| JP | 2010-181335 A | 8/2010 |
| WO | WO-03/098260 A1 | 11/2003 |

* cited by examiner

| Pn | | | | | | | | INSTABILITY | Qn |
|---|---|---|---|---|---|---|---|---|---|
| 0 | 1 | 0 | 1 | 0 | 1 | 0 | 1 | 7 | 1 |
| 0 | 1 | 1 | 1 | 1 | 1 | 1 | 1 | 1 | 0 |

FIG. 2

RADAR DEVICE AND ECHO DATA PROCESSING DEVICE

CROSS-REFERENCE TO RELATED APPLICATION(S)

This application claims priority under 35 U.S.C. §119 to Japanese Patent Application No. 2009-043444, which was filed on Feb. 26, 2009, the entire disclosure of which is hereby incorporated by reference.

TECHNICAL FIELD

The present invention relates to a radar device for converting echo data of a polar coordinate system into image data of a rectangular coordinate system to be displayed.

BACKGROUND

Conventionally, radar devices for detecting target objects of all the directions around a ship concerned acquire echo data of a polar coordinate system, while rotating (sweep) a radar antenna at a predetermined speed (cycle). The radar device converts the echo data of the polar coordinate system into image data of a rectangular coordinate system, and then writes the image data in an image memory. The radar device reads image data stored in the image memory at predetermined timings to display the image data. A display module of the radar device typically displays the read image data with various colors depending on its data levels. For example, a target object display device disclosed in JP 1983-53778(A) changes display color according to moving speeds of target objects, changes the display color according to kinds of target objects, such as land, a ship, and a buoy.

However, the situation of an area being detected by the radar and the situation of each target object existing in the area concerned change every moment, as well as the situation of the ship concerned which carries out the detection changes every moment. For this reason, it is difficult to correctly identify the kinds of target object echoes, such as identifying moving target object echoes and stationary target object echoes, or identifying moving target object echoes and sea surface reflection echoes.

SUMMARY

Therefore, the present invention provides a radar device capable of correctly identifying kinds of target objects that are detected by echoes.

An aspect of the present invention, a radar device includes an antenna, from which a detection signal is transmitted while the antenna being rotated and by which a reflective wave of the transmitted detection signal is received to detect echo data, wherein image data is generated based on the detected echo data, a continuity detecting module for detecting a planar continuity of the currently detected echo data with respect to a pixel concerned in the image data, a behavior data generating module for generating behavior data indicative of a behavior of the echo data for a predetermined number of scans of the past in the pixel concerned based on behavior determination data, and an echo kind determining module for determining a kind of the echo data of the pixel concerned based on the planar continuity and the behavior data.

This aspect of the invention focuses on that the echo data have different planar characteristics and time-series characteristics according to kinds of detection targets (stationary target objects, moving target objects, sea surface reflections, radar interferences, etc.), and planar continuity and time-series behavior of the echo data, whose level reaches a target object detection level, are detected. The kinds of echo data can be determined by combining the detection results of the planar continuities and the detection results of the time-series behaviors.

The echo kind determining module may determine the echo data of the pixel concerned to be echo data of a stationary target object based on the number of the behavior determination data, each of which indicates that the level of the detected echo data is greater than the predetermined target object detection threshold, is greater than a predetermined stationary target object detection threshold. The behavior determination data may include all the behavior determination data constituting the behavior data of the pixel concerned.

The echo kind determining module may determine the echo data of the pixel concerned to be echo data of a moving target object based on that only one behavior determination data corresponding to the most recent behavior data or only the most recent two or more continuing behavior determination data for a predetermined number of the scans is behavior determination data, each of which indicates that the level of the detected echo data is greater than the predetermined target object detection threshold, and is high in the planar continuity of the echo data of the pixel concerned.

The echo kind determining module may determine the echo data of the pixel concerned to be unnecessary data based on that the number of the behavior determination data, each of which indicates that the level of the detected echo data is greater than the predetermined target object detection threshold, is below a predetermined stationary target object detection threshold, and the echo data of the pixel concerned is low in the planar continuity.

The echo kind determining module may determine the echo data of the pixel concerned to be a radar interference wave based on that the number of the behavior determination data, each of which indicates that the level of the detected echo data is greater than the predetermined target object detection threshold, is below a predetermined stationary target object detection threshold, and the planar continuity is high in a distance direction with respect to a rotation center of the antenna and is low in a rotational direction of the antenna.

The radar device may further includes a sea surface reflection area detecting module for detecting a sea surface reflection area where a reflective echo from a sea surface exists by a predetermined technique. The predetermined technique may include, but not limited to, JP2009-58433(A), the entire disclosure of which is hereby incorporated by reference. The echo kind determining module may detect that the pixel concerned exists within the sea surface reflection area, and when the echo kind determining module determines the echo data of the pixel concerned is not echo data of a stationary target object or a moving target object, it may determine that the echo data of the pixel concerned is a sea surface reflection wave.

The radar device may further include color palette having different color information, and a color setting module for setting different color information for each echo kind classified based on the echo kind determination result.

The color setting module may further set a shade according to a level of image data of the pixel concerned based on the echo data.

The behavior determination data may be indicative of whether a level of the detected echo data is greater than a predetermined target object detection threshold.

The behavior data may be comprised of binary data.

According to another aspect of the invention, an echo data processing device includes an image data generating module for generating image data based on echo data that is a reflective wave of a detection signal, a continuity detecting module for detecting a planar continuity of the echo data constituting the image data, a behavior data generating module for generating behavior data indicative of a time-series behavior of the echo data over a predetermined number of scans of the past, and an echo kind determining module for determining a kind of the echo data based on the planar continuity and the behavior data of the echo data.

This aspect of the invention focuses on that the echo data have different planar characteristics and time-series characteristics according to kinds of detection targets (stationary target objects, moving target objects, sea surface reflections, radar interferences, etc.), and planar continuity and time-series behavior of the echo data, whose level reaches a target object detection level, are detected. The kinds of echo data can be determined by combining the detection results of the planar continuities and the detection results of the time-series behaviors.

The echo kind determining module may determine whether the echo data is a stationary target object, a moving target object, an unnecessary wave, a radar interference wave, and/or a sea surface reflection wave.

According to another aspect of the invention, a method of processing echo data includes generating image data based on echo data that is a reflective wave of a detection signal, detecting a planar continuity of the echo data constituting the image data, generating behavior data indicative of a time-series behavior of the echo data over a predetermined number of scans of the past, and determining a kind of the echo data based on the planar continuity and the behavior data of the echo data.

Determining the kind of the echo data may include determining the echo data of a stationary target object first.

Determining the kind of the echo data may include determining the echo data of a moving target object after the determination of the echo data of the stationary target object.

Determining the kind of the echo data may include determining the echo data of a seas surface reflection wave after the determination of the echo data of the stationary target object and the echo data of the moving target object.

BRIEF DESCRIPTION OF THE DRAWINGS

The present disclosure is illustrated by way of example and not by way of limitation in the figures of the accompanying drawings in which the like reference numerals display like elements and in which:

FIG. 2 is a view showing a relation between behavior data, instability, and the instable state detection data;

DETAILED DESCRIPTION

Hereinbelow, radar devices will be described in several embodiments of the present invention with reference to the appended drawings. In these embodiments, the radar devices are particularly described merely as examples; however, the present invention may also be applied to other devices that detects and displays target object(s), such as sonar. Note that, in the following embodiments, sea application is described for the radar device; however, the radar device may be applied to any other application.

Embodiment 1

Figure 1:
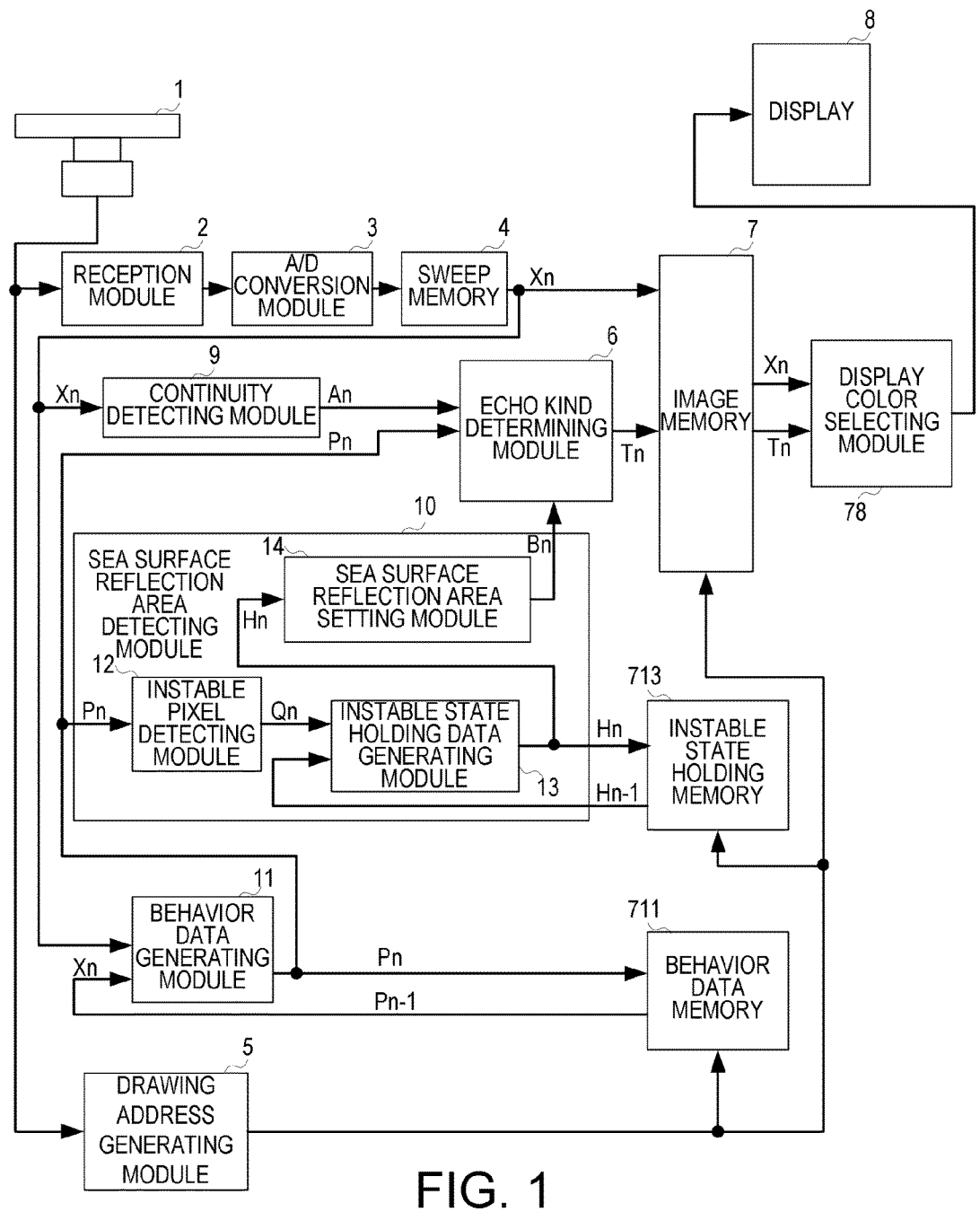
FIG. 1 is a block diagram showing a substantial configuration of a radar device according to Embodiment 1 of the present invention.

FIG. 1 is a block diagram showing a substantial configuration of a radar device of an embodiment. A radar antenna 1 of the radar device of this embodiment emits a pulse-shaped electric wave, while rotating horizontally (sweep) at a predetermined rotational speed (cycle). The rotation cycle is different from the transceiving cycle of the electric waves. The radar antenna 1 receives reflective waves from target object(s) which exists around the radar device concerned, typically equipped on a ship, as data of a polar coordinate system. The radar antenna 1 outputs the received signals to a reception module 2, and outputs sweep angle data to a drawing address generating module 5.

The reception module 2 detects and amplifies the received signals from the radar antenna 1, and then outputs the amplified received signals to an A/D conversion module 3. The A/D conversion module 3 converts the amplified received signals, which are analog data, into digital data (echo data) having two or more bits.

A sweep memory 4 stores in real time the echo data for one sweep, which are converted into digital data by the A/D conversion module 3. By the time new echo data obtained by the next transmission are written in the sweep memory 4, the sweep memory 4 outputs echo data Xn for the one sweep to an image memory 7, a continuity detecting module 9, and a behavior data generating module 11.

The drawing address generating module 5 sets a start address at the center of the antenna sweep rotation. The drawing address generating module 5 creates, based on an antenna angle θ and a read-out position r of the sweep memory 4 with respect to a predetermined direction radially extending from the center (for example, a bow direction), corresponding addresses which specify pixels in the image memory 7, a behavior data memory 711, and an instable state holding memory 713 which are arranged in a rectangular coordinate system. The drawing address generating module 5 is particularly constituted by a hardware that realizes the following equations.

$$X = X_s + r \sin \theta \quad (1)$$

$$Y = Y_s + r \cos \theta \quad (2)$$

Here, X and Y are addresses which specify the pixels in the image memory 7, the behavior data memory 711, and the instable state holding memory 713. Xs and Ys indicate the center addresses of the sweep (antenna) rotation, r is a distance from the center, and θ is an angle of the sweep (antenna).

A sea surface reflection area detecting module 10 includes an instable pixel detecting module 12, an instable state holding data generating module 13, and a sea surface reflection area determining module 14.

The behavior data generating module 11 determines whether the current echo data Xn inputted from the sweep memory 4 is greater than a predetermined detection threshold. For the detection threshold, a value obtained by adding a predetermined offset to detected white noise level is used, for example. The behavior data generating module 11 generates behavior determination data including "1" when the current echo data Xn is greater than the detection threshold, and it generates behavior determination data including "0" when the current echo data Xn is below the detection threshold.

The behavior data memory 711 is a storage medium for storing behavior data for every pixel which are set as addresses of the rectangular coordinate system, similar to the image memory 7 and the instable state holding memory 713 which are described later in detail. The addresses are set in the behavior data memory 711, the image memory 7, and the instable state holding memory 713 so that they correspond to the pixel addresses. Two or more bits are assigned for each pixel in the behavior data memory 711. The behavior data memory 711 has a capacity for storing the behavior determination data for two or more scans in a time series. At this time, new behavior determination data is stored in the lowest bit as the already stored data shift to higher bits by one bit, respectively, from LSB toward MSB in a time series, in a FIFO manner.

The behavior data generating module 11 generates the current behavior determination data synchronizing with the conversion process from the polar coordinate system to the rectangular coordinate system. The behavior data generating module 11 reads from the behavior data memory 711 behavior data Pn−1 having two or more bits including behavior determination data of the past two or more scans in the pixel addresses corresponding to the current behavior determination data. The behavior data generating module 11 shifts each behavior determination data of the read behavior data Pn−1 to a higher bit by one bit, and then outputs the newest or current behavior data Pn as the current behavior determination data which is the lowest bit. For example, when each pixel is set as 8-bit configuration, the behavior determination data ranging from bit0 to bit6 of read behavior data Pn−1 are shifted to the range of bit1 to bit7, respectively. The behavior determination data of bit7 is discarded, and the current behavior determination data is newly assigned to bit0. Thereby, the behavior determination data for the past eight scans including the current data are stored.

Thus, the current behavior data Pn outputted from the behavior data generating module 11 is stored into the correspondence pixel address in the behavior data memory 711, while being inputted into the instable pixel detecting module 12 and an echo kind determining module 6.

The instable pixel detecting module 12 acquires the behavior data Pn from the behavior data generating module 11, and then calculates the number of state changes between the adjacent bits of the behavior data Pn as an instability. That is, the instable pixel detecting module 12 detects the number of times which changes from "0" to "1" or from "1" to "0" between the adjacent bits (for example, bit0 and bit1, or bit6 and bit7).

Figure 2:
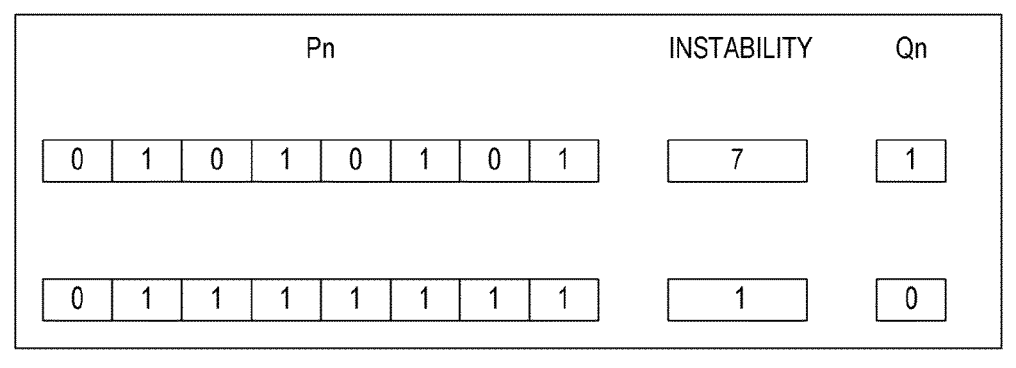

For example, FIG. 2 is a view showing a relation between the behavior data Pn, the instability, and the instable state detection data Qn. As shown in the upper row of FIG. 2, when the behavior determination data of the behavior data Pn become alternately "0" and "1" for each scan, the instability in this case is calculated as "7" because the state change occur seven times in 8 bits. Alternatively, as shown in the lower row of FIG. 2, when the behavior determination data of the behavior data Pn changes from "0" to "1" only once, the instability in this case is calculated as "1" because the state change occurs only once in 8 bits.

As described above, the instable pixel detecting module 12 detects how echo data are transitional based on the detection threshold for the two or more scans including the current scan with respect to the pixel to be determined. For example, the instable pixel detecting module 12 detects whether the echo data greater than the detection threshold are acquired stably and continuously, whether the echo data below the detection threshold are acquired stably and continuously, the echo data greater than the detection threshold and the echo data below the detection threshold are acquired in an irregular order.

If the instability is calculated, the instable pixel detecting module 12 compares it with a predetermined instable state detection threshold. Then, if the instability is greater than the instable state detection threshold, the instable pixel detecting module 12 generates instable state detection data Qn of "1," and if the instability is below the instable state detection threshold, the instable pixel detecting module 12 generates instable state detection data Qn of "0." For example, when the instable state detection threshold is set to the instability="4," if it is the case as shown in the upper row of FIG. 2, the instable state detection data Qn of "1" is generated because it is the instability="7." Alternatively, if it is the case as shown in the lower row of FIG. 2, the instable state detection data Qn of "0" is generated because it is the instability="1." The instable pixel detecting module 12 outputs the instable state detection data Qn to the instable state holding data generating module 13.

Thereby, in that case, the instable pixel detecting module 12 detects that the pixel to be detected is in an instable state, i.e., it is in an area where the target object detection becomes instable due to sea surface reflections, etc. This utilizes, in a situation in which the sea surface reflections are detected irregularly without the sea surface reflections appearing at the same positions for every scan, in a pixel from which the instable situation, i.e., the sea surface reflection is detected, each bit of the behavior data, i.e., the behavior determination data has a high probability that "1" and "0" are irregularly lined up, and the instability becomes greater. On the other hand, compared with the sea surface reflections, in a pixel from which a target object is detected or a pixel from which nothing is detected, each bit of the behavior data, i.e., the behavior determination data has a higher probability that "1" and "0" are regularly lined up and the instability becomes less.

The instable state holding data generating module 13 holds information on that the pixel to be determined is in an instable state between two or more scans, by using the value of the instable state detection data Qn and the instable state holding memory 713. The instable state holding memory 713 is a memory having a capacity of two or more bits for each pixel position corresponding to each pixel in the image memory 7 one to one.

For example, if it is desired to hold instable state detection results for M scans with respect to the pixels which are determined to be in an instable state, the instable state holding data generating module 13 sets the current instable state holding data Hn to "M" (M is an integer) regardless of the value of the last instable state holding data Hn−1 if the instable state detection data Qn is "1." On the other hand, if the instable state detection data Qn is "0," the instable state holding data generating module 13 sets the value obtained by subtracting 1 from the value of the last instable state holding data Hn−1 to the current instable state holding data Hn. The instable state holding data generating module 13 outputs the current set instable state holding data Hn to the sea surface reflection area setting module 14.

By performing such processing, for a pixel from which an instable state is detected, even if stable states are detected continuously after that, the instable state holding data Hn will not be "0" for a predetermined number of scans (M times in the above-described example) after the time including the timing of the current instable state detection. Thereby, for the pixels from which the instable states are detected, the instable states can be held for the predetermined number of scans (M times). This is processing corresponding to the ability not to clearly divide the boundary of the sea surface reflection area. Specifically, the sea surface reflection changes according to an oceanic condition, a wind direction, an antenna height, an adjustment of STC (Sensitivity Time Control), etc. Further, the sea surface reflection becomes weaker as it is apart from the ship concerned in distance. For this reason, even if the boundary of the sea surface reflection cannot be clearly divided and the state temporarily changes from an instable state to a stable state, the probability that the echo data of the pixel to be determined is a sea surface reflection is high. Therefore, by performing such processing, it can prevent the sea surface reflection from being emphasized by processing described later.

Note that the detection and settings of the sea surface reflection area are not limited to those by the above-described method, and the detection and settings may be performed using other known methods, or they may be appropriately set with a manual input by an operator.

The sea surface reflection area setting module 14 determines whether the inputted instable state holding data Hn is Hn=0 or Hn≠0. If the instable state holding data is Hn≠0, the sea surface reflection area setting module 14 detects the pixel corresponding to the instable state holding data Hn concerned as a sea surface reflection area setting reference pixel. If the sea surface reflection area reference pixel is detected, the sea surface reflection area setting module 14 determines a sea surface reflection expansion area of a rectangular coordinate system so that the sea surface reflection area is expanded in the direction of a distance R and the direction of an azimuth θ from the sea surface reflection area reference pixel concerned.

Figure 3A:
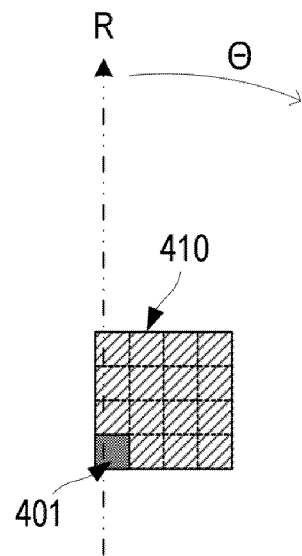
FIGS. 3A and 3B are views showing a concept of expanding a sea surface reflection area.
Figure 3B:
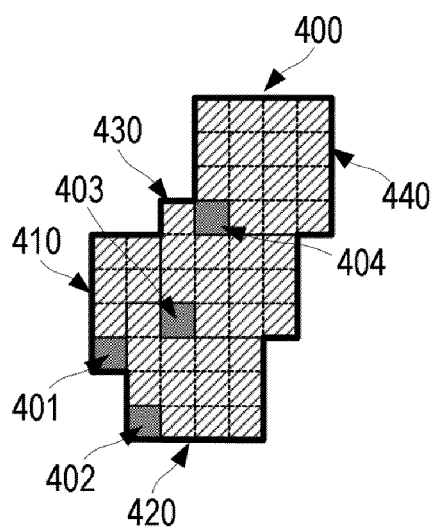

FIGS. 3A and 3B are views showing a concept of expanding the sea surface reflection area. Particularly, FIG. 3A shows a concept of expanding from one sea surface reflection area reference pixel, and FIG. 3B shows a concept of superposing the sea surface reflection expansion areas by the respective sea surface reflection area reference pixels.

Explaining in more detail referring to FIGS. 3A and 3B, if a sea surface reflection area reference pixel 401 is detected as shown in FIG. 3A, the sea surface reflection area setting module 14 determines a sea surface reflection expansion area 410 by selecting two or more pixels of a rectangular coordinate system so that the sea surface reflection area is expanded in the direction of a distance R and the direction of an azimuth θ. Here, the sea surface reflection area setting module 14 expands a predetermined number of pixels (3 pixels in both the direction of distance and the direction of sweep rotation in FIG. 3A) as a sea surface reflection area to set the sea surface reflection expansion area 410 so that, in the sea surface reflection expansion area 410, the sea surface reflection area reference pixel 401 is located the nearest in the direction of distance to the center of sweep and the closest to the starting point in the direction of sweep rotation.

The setting of the sea surface reflection expansion area is performed every time the instable state holding data Hn≠0 is received. As shown in FIG. 3B, the sea surface reflection area setting module 14 sets a combination (a synthetic sea surface reflection area 400) of the sea surface reflection expansion area 410 based on the sea surface reflection area reference pixel 401, the sea surface reflection expansion area 420 based on the sea surface reflection area reference pixel 402, the sea surface reflection expansion area 430 based on the sea surface reflection area reference pixel 403, and the sea surface reflection expansion area 440 based on the sea surface reflection area reference pixel 40.

By using such processing, not only the pixel actually detected as the instable state but the pixel having a high possibility of being in the instable state near the pixel concerned can be expanded based on the pixel concerned, and the expanded pixel area can be set as a sea surface reflection area. This is because the neighborhood of the pixel in the instable state naturally has a high possibility of being in the instable state, and thereby a planar expansion setting of the sea surface reflection suppressed area can be performed.

By using such processing, not only the pixel actually detected as the instable state but the pixel having a high possibility of being in the instable state near the pixel concerned can be expanded based on the pixel concerned, and the expanded pixel area can be set as a sea surface reflection area. This is because the neighborhood of the pixel in the instable state naturally has a high possibility of being in the instable state, and thereby a planer expansion setting of the sea surface reflection suppressed area can be performed.

The continuity detecting module 9 includes a buffer memory for storing echo data Xn inputted from the sweep memory 4 for a predetermined azimuth range, and detects a continuity of the echo data Xn to be determined.

Figure 4A:
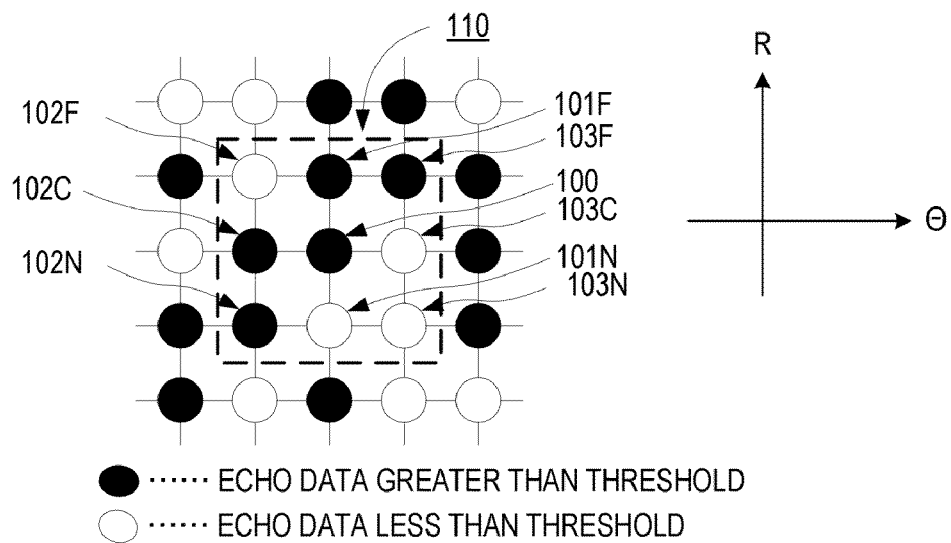
FIGS. 4A and 4B are views illustrating a concept of continuity.
Figure 4B:
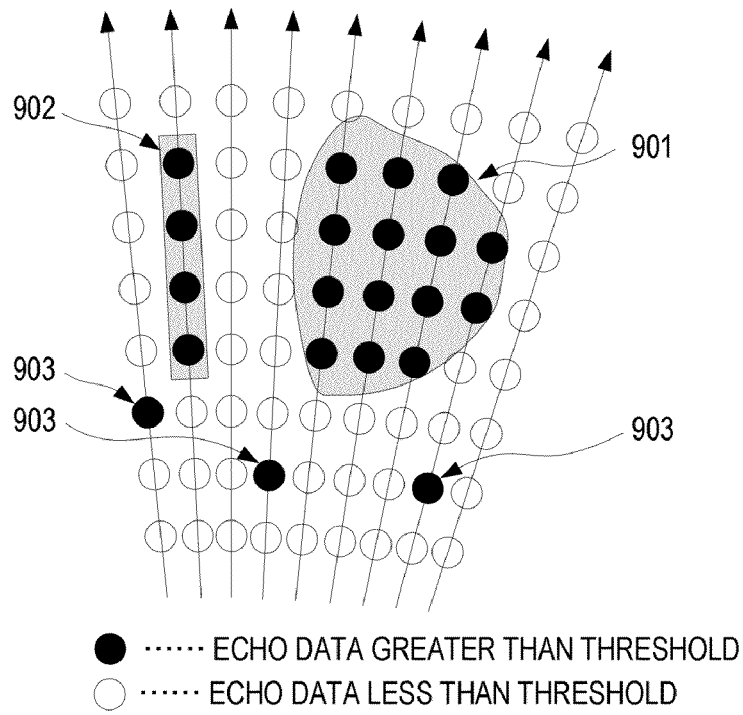

FIGS. 4A and 4B are views illustrating a concept of the continuity. Particularly, FIG. 4A is a view illustrating continuity determination, and FIG. 4B illustrating an example of the continuity determination for every target object, interference, and white noise.

The continuity detecting module 9 extracts, from the buffer memory, echo data which exists within a continuity determination reference area 110 containing echo data which is a determination target of continuity. Here, as shown in FIG. 4A, the continuity determination reference area 110 is an area surrounding nine echo data 101N and 101F, echo data 102C and 103C, and 102N, 102F, 103N, and 103F, as well as echo data 100 to be determined which is adjacent to all the echo data described above and is located at the center of the area, for example. The echo data 101N and 101F are adjacent to the echo data 100 in the direction of distance R, the echo data 102C and 103C are adjacent to the echo data 100 in the direction of azimuth θ, and the echo data 102N, 102F, 103N, and 103F are adjacent to the echo data 100 in 45 degrees with respect to both the direction of distance R and the direction of azimuth θ.

The continuity detecting module 9 detects data levels of these echo data 100, 101N, 101F, 102N, 102C, 102F, 103N, 103C, and 103F. If the number of echo data having a level greater than a predetermined detection threshold is greater than a predetermined determination threshold, the continuity detecting module 9 determines that they have continuity, and then outputs continuity data An=1 to the echo kind determining module 6. On the other hand, if the number of echo data having a level greater than the predetermined detection threshold is below the predetermined determination threshold, the continuity detecting module 9 determines that they do not have continuity, and then outputs continuity data An=0 to the echo kind determining module 6.

For example, as shown in FIG. 4B, because a target object 901 is formed by the echo data having a level greater than the detection threshold being gathered, the echo data having a level greater than the detection threshold which exist in the continuity determination reference area 110 exist in a greater number. On the other hand, because interference 902 is formed by the echo data having a level greater than the predetermined threshold existing only in the same azimuth direction, the echo data having a level greater than the detection threshold which exist in the continuity determination reference area 110 exist in a less number. Further, because the white noise 903 typically occurs only at a single moment in many cases, the echo data having a level greater than the detection threshold which exist in the continuity determination reference area 110 also exist in a less number.

Therefore, the target object can be distinguished from the interference and the white noise by setting the determination threshold of continuity to 50%, for example, so that the number of echo data having a level greater than the detection threshold which exist in the continuity determination reference area 110 is greater than the number of the majority of echo data in the continuity determination reference area 110.

The echo kind determining module 6 determines an echo kind of the calculated current echo data Xn based on the current behavior data Pn, the continuity data An, and the sea surface reflection area data Bn, and then determines echo identification data Tn.

Figure 5:
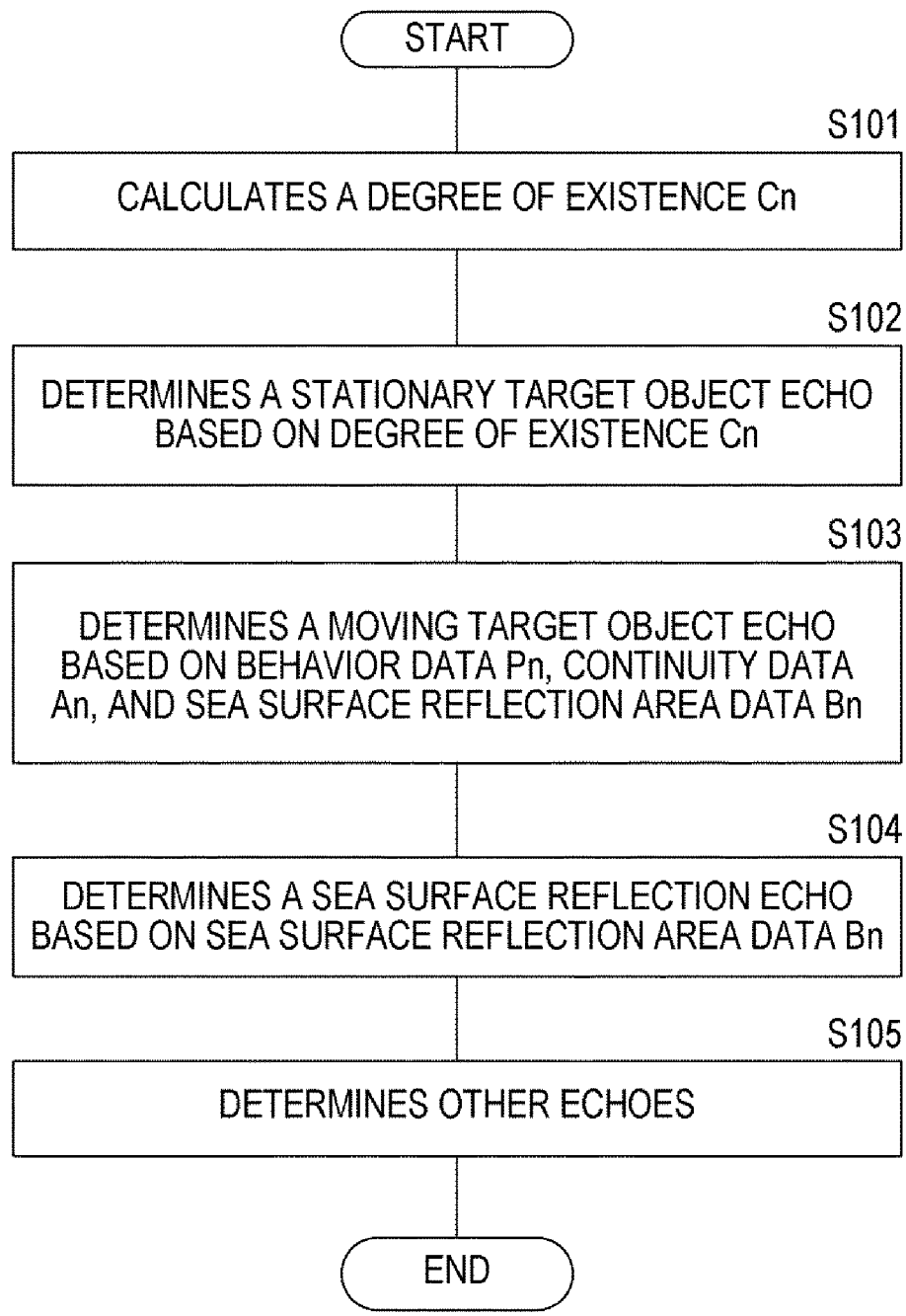
FIG. 5 is a flowchart showing a determination flow of echo identification data.

FIG. 5 is a flowchart showing a determination flow of the echo identification data Tn. The echo kind determining module 6 calculates a degree of existence Cn based on the current behavior data Pn (S101). The degree of existence Cn is determined by how many the behavior determination data including "1" exist in the behavior determination data for the predetermined scans which constitute the behavior data Pn. For example, if Pn={11111111}, the degree of existence is Cn="8," and if Pn={0101010101}, the degree of existence is Cn="4." Thus, the degree of existence Cn is greater as the number of the echo data greater than the detection threshold exist in the same pixel becomes greater.

The echo kind determining module 6 utilizes this nature, and sets a stationary target object discrimination threshold for the degree of existence. If the degree of existence Cn is greater than the stationary target object discrimination threshold, the echo kind determining module 6 determines that the echo data is a stationary target object echo, and sets echo identification data Tn which indicates a stationary target object echo (S102). For example, if the stationary target object discrimination threshold is "6," the echo data of the pixel to be discriminated having the degree of existence Cn≧6 is considered to be a stationary target object echo, and the echo identification data Tn="3" is set to the echo data concerned.

Next, the echo kind determining module 6 determines a moving target object echo based on the behavior data Pn, the continuity data An, and the sea surface reflection area data Bn (S103). Specifically, the echo kind determining module 6 determines the echo data of the pixel to be discriminated as a moving target object echo if the following Conditions (A) and (B) are satisfied simultaneously, and then sets the echo identification data Tn="2" indicating a moving target object echo with respect to the echo data concerned:

Condition (A): the continuity data An is greater than the predetermined target object detection threshold (for example, greater than "3"); and Condition (B): predetermined bits of the behavior data Pn on the LSB side are continuously "1," that is, a state where the behavior data Pn only contains "0" changes to a state where the data are newly updated to "1" from the LSB side (Pn={00000001}), or the data having "1" are continuously updated (Pn={00000011}).

This is based on that, if it is a moving target object, it has a predetermined continuity planarly, and the behavior determination data changes from "0" to "1" from the timing at which the target object reaches the pixel concerned by its movement. Note that, within the sea surface reflection area, the continuity data An and the behavior data Pn may be similar to those of the moving target object due to the state of sea surface reflections. Therefore, in order to avoid that the sea surface reflections are accidentally determined to be echoes from the moving target object, the following Condition (C) may be additionally used together with the above-described Conditions (A) and (B):

Condition (C): the sea surface reflection data Bn="0," i.e., it is outside a sea surface reflection area.

Next, the echo kind determining module 6 determines whether the sea surface reflection area data Bn is a sea surface reflection echo (S104). If Bn="1," the echo kind determining module 6 determines that it is a sea surface reflection echo, and then sets as the echo identification data Tn="1" to the echo data concerned, which indicates the sea surface reflection echo.

Next, the echo kind determining module 6 determines echo data which was not determined at Steps S102 to S104 as other echo indicating radar interference or the like, and then sets the echo identification data Tn to Tn="0," which indicates the other echo with respect to the echo data concerned. Note that echo of radar interference wave may be distinguished by calculating by dividing the continuity data An into sweep distance direction continuity data Anr and sweep azimuth direction continuity data Anθ, and detecting that only the sweep distance direction continuity data Anr is high. Thus, echo data can be distinguished for each kind of target object by using the above-described configuration and method.

The echo kind determining module 6 outputs the echo identification data Tn to the image memory 7 at the timing of the current echo data Xn being given to the image memory 7. The image memory 7 is a memory having the capacity of storing the echo data Xn for one antenna rotation (i.e., one sweep rotation) and the corresponding echo identification data Tn.

In the image memory 7, the current echo data Xn generated by the echo kind determining module 6 and the echo identification data Tn associated with the echo data Xn concerned are written in the pixel addresses specified by the drawing address generating module 5. When the display 8 is raster scanned by a display control module (not illustrated), the echo data Xn and the echo identification data Tn are read from the image memory 7 synchronizing with the raster scanning operation. The read echo data Xn and the echo identification data Tn are given to a display color selecting module 78.

The display color selecting module 78 includes color palette having different colors based on RGB. The display color selecting module 78 select a color based on identification data. For example, if the echo identification data is Tn="3," it is indicated by green, if the echo identification data is Tn="2," it is indicated by red, the echo identification data is Tn="1," it is indicated by blue. and if the echo identification data is Tn="0," it is indicated by yellow.

The display color selecting module 78 selects a color corresponding to the received echo identification data Tn, and then gives display color information on the selected color to the display 8 along with the echo data Xn.

Further, by using the read echo data Xn and display color information, the display control module forms image data by changing the chromaticity (shade or contrast) according to the level of the echo data Xn to carry out display control of the display 8 based on the image data.

With such configuration and processing, the kinds of echoes can be determined correctly. In addition, the colored display screen as shown in FIG. 6 can be obtained based on the kinds of the identified echoes.

Figure 6:
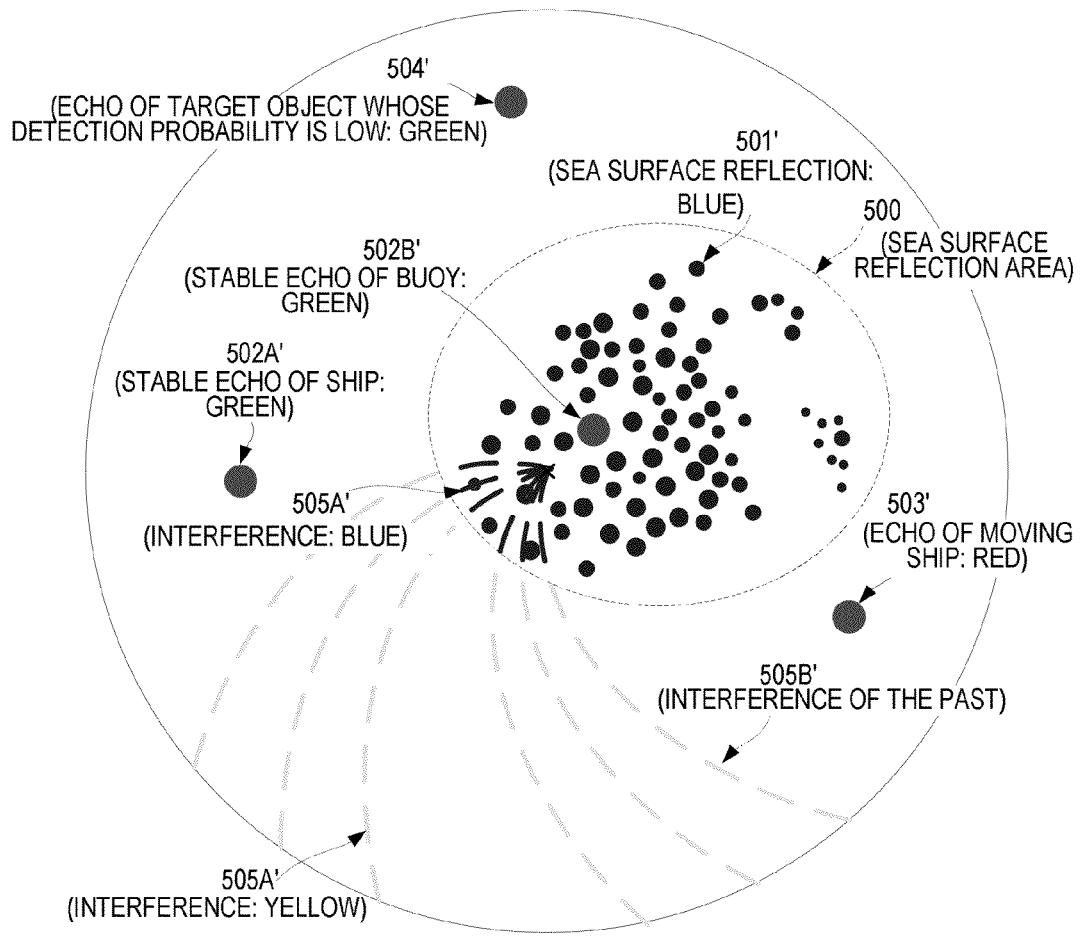
FIG. 6 is a view showing an example of a display screen when using the configuration and processing of Embodiment 1.

FIG. 6 is a view showing an example of the display screen when using the configuration and processing of this embodiment. In FIG. 6, within the sea surface reflection area 500, the echoes indicated by circle symbols other than the stationary target object echo 502B' are the sea surface reflection echoes.

As shown in FIG. 6, by using the configuration of this embodiment, outside the sea surface reflection area, the stationary target object echoes 502A' and 504' are displayed in green, the moving target object echo 503' is displayed in red, and other echo 505A' is displayed in yellow. On the other hand, inside the sea surface reflection area 500, the stationary target object echo 502B' is displayed in green, and the sea surface reflection echo 501' and other echo (interference) 505A' are displayed in blue.

As described above, by using the configuration of this embodiment, the echoes are displayed in different colors according to their kinds. Therefore, one can easily discriminate the types of echoes only by seeing the displayed echo colors.

Embodiment 2

Next, a radar device according to another embodiment is described with reference to the appended drawings. The radar device of this embodiment additionally has a scan-to-scan correlation processing capability, compared with the radar device of the previous embodiment. Hereinbelow, only different parts from the previous embodiment will thus be described.

Figure 7:
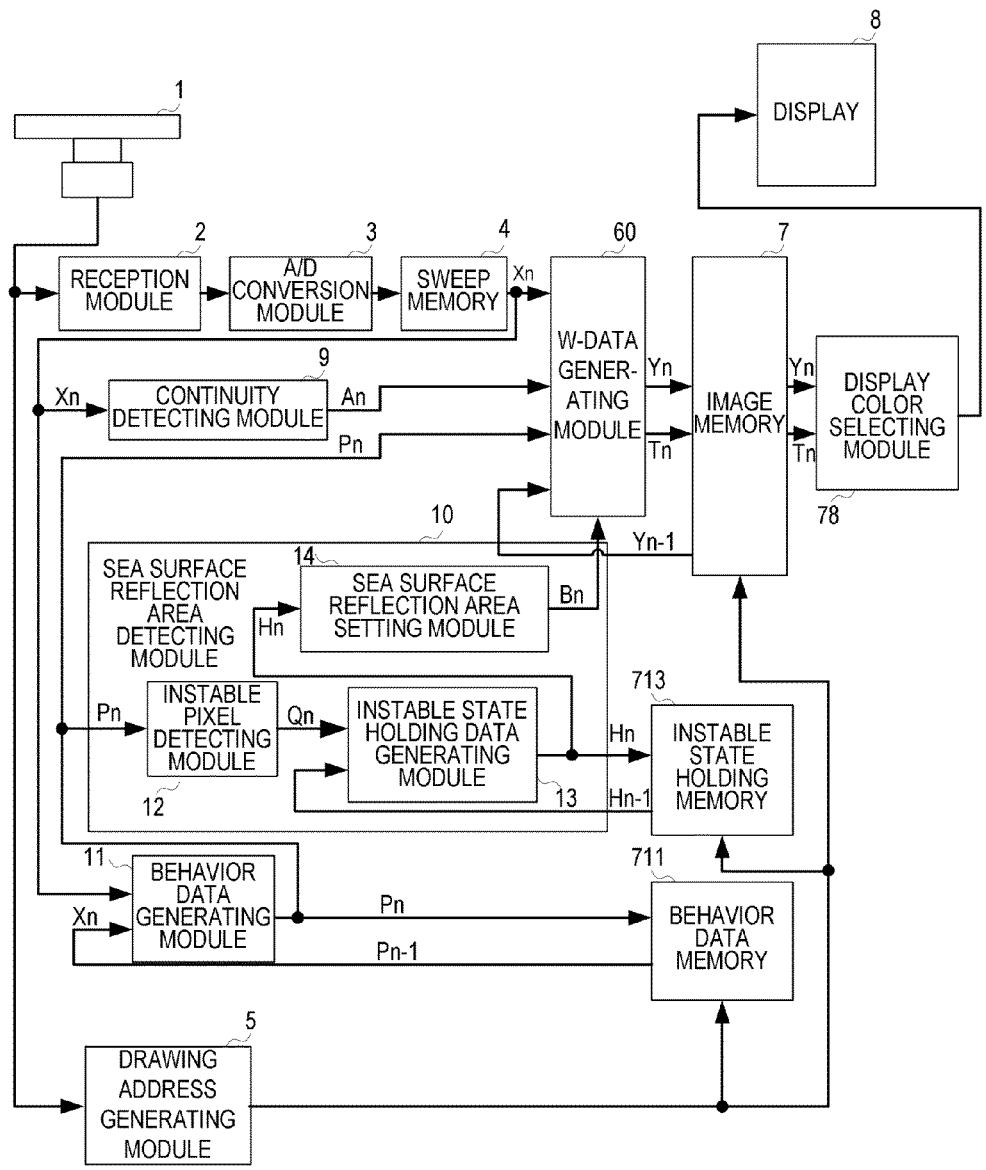
FIG. 7 is a block diagram showing a substantial configuration of a radar device of Embodiment 2.

FIG. 7 is a block diagram showing a substantial configuration of the radar device of this embodiment. In this embodiment, the radar device includes a W-data generating module 60 having a function for performing scan-to-scan correlation processing as well as the function of the echo kind determining module 6 of the previous embodiment. In connection with this, echo data Xn outputted from the sweep memory 4 are inputted into the W-data generating module 60. The image memory 7 is a memory having a capacity for storing scan-to-scan correlation processing result data for one antenna rotation (i.e., one sweep rotation) and corresponding echo identification data Tn.

The W-data generating module 60 calculates current scan-to-scan correlation processing result data Yn based on current echo data Xn inputted from the sweep memory 4, scan-to-scan correlation processing result data Yn−1 of one rotation before read from the image memory 7, continuity data An from the continuity detecting module 9, behavior data Pn from the behavior data generating module 11, and sea surface reflection area data Bn from the sea surface reflection area setting module 14.

In this embodiment, the W-data generating module 60 includes a hardware for performing the calculation of the following equation.

$$Yn = \alpha \cdot Xn + \beta \cdot Yn-1 \quad (3)$$

Here, the values of $\alpha$ and $\beta$ are suitably set according to the kind of echo data to suppress the level of sea surface reflection echoes which largely varies, and thereby the level of stationary target object echo, such as a buoy, which exists within the area of the sea surface reflection concerned can be increased. Further, by changing the chromaticity in the above-described color information (shade or contrast) according to the level of stationary target object echo, as shown in FIG. 8, it is easier to identify the stationary target object echo and the sea surface reflection echo, and the moving state of a moving target object echo is easier to identify in the display.

Figure 8:
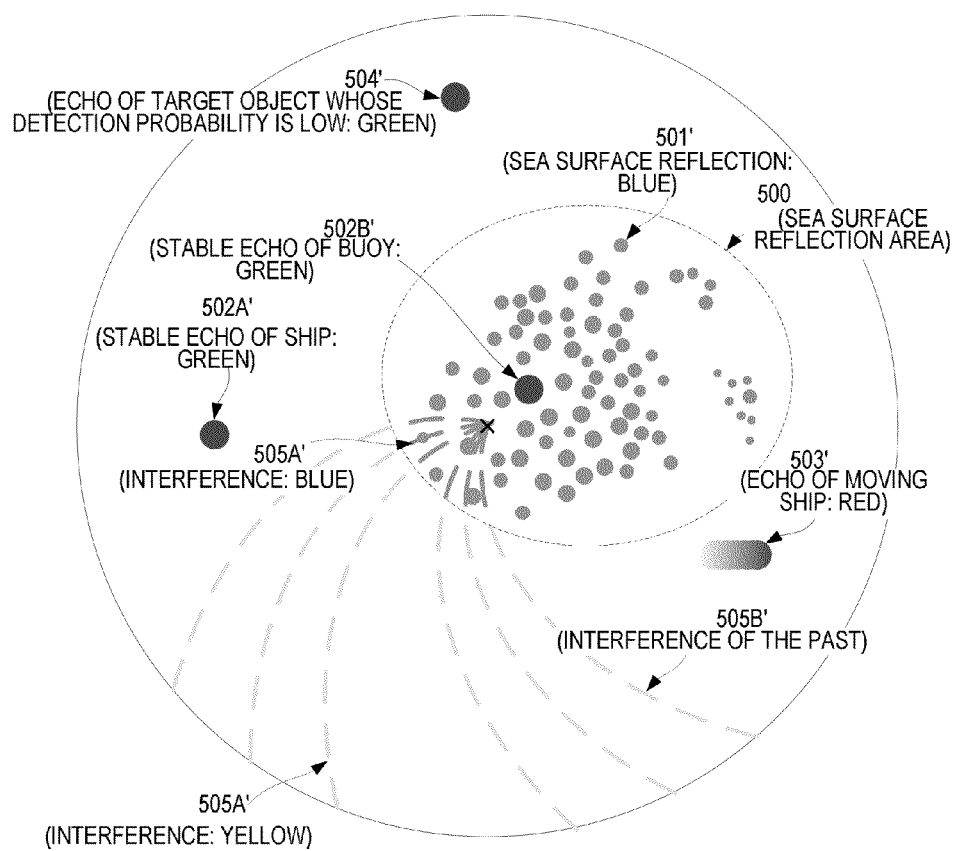
FIG. 8 is a view showing an example of a display screen when using the configuration and processing of Embodiment 2.

FIG. 8 is a view showing an example of a display screen when using the configuration and processing of this embodiment. As described above, by using the configuration and processing of this embodiment, the kinds of echoes can be discriminately displayed using shades as well as using colors. Therefore, a display screen with a good visual discrimination capability can be realized.

In the foregoing specification, particular embodiments of the present invention have been described. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual relationship or order between such entities or actions. The terms "comprises," "comprise," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A radar device, comprising:
   an antenna, from which a detection signal is transmitted while the antenna being rotated and by which a reflective wave of the transmitted detection signal is received to detect echo data, wherein image data is generated based on the detected echo data;

a continuity detecting module for detecting a planar continuity of the currently detected echo data with respect to a pixel concerned in the image data;

a behavior data generating module for generating behavior data indicative of a behavior of the echo data for a predetermined number of scans of the past in the pixel concerned based on behavior determination data; and an echo kind determining module for determining a kind of the echo data of the pixel concerned based on the planar continuity and the behavior data.

2. The radar device of claim 1, wherein the echo kind determining module determines the echo data of the pixel concerned to be echo data of a stationary target object based on the number of the behavior determination data, each of which indicates that the level of the detected echo data is greater than the predetermined target object detection threshold, is greater than a predetermined stationary target object detection threshold, the behavior determination data including all the behavior determination data constituting the behavior data of the pixel concerned.

3. The radar device of claim 1, wherein the echo kind determining module determines the echo data of the pixel concerned to be echo data of a moving target object based on that only one behavior determination data corresponding to the most recent behavior data or only the most recent two or more continuing behavior determination data for a predetermined number of the scans is behavior determination data, each of which indicates that the level of the detected echo data is greater than the predetermined target object detection threshold, and is high in the planar continuity of the echo data of the pixel concerned.

4. The radar device of claim 1, wherein the echo kind determining module determines the echo data of the pixel concerned to be unnecessary data based on that the number of the behavior determination data, each of which indicates that the level of the detected echo data is greater than the predetermined target object detection threshold, is below a predetermined stationary target object detection threshold, and the echo data of the pixel concerned is low in the planar continuity.

5. The radar device of claim 1, wherein the echo kind determining module determines the echo data of the pixel concerned to be a radar interference wave based on that the number of the behavior determination data, each of which indicates that the level of the detected echo data is greater than the predetermined target object detection threshold, is below a predetermined stationary target object detection threshold, and the planar continuity is high in a distance direction with respect to a rotation center of the antenna and is low in a rotational direction of the antenna.

6. The radar device of claim 1, further comprising a sea surface reflection area detecting module for detecting a sea surface reflection area where a reflective echo from a sea surface exists by a predetermined technique;

wherein the echo kind determining module detects that the pixel concerned exists within the sea surface reflection area, and when the echo kind determining module determines the echo data of the pixel concerned is not echo data of a stationary target object or a moving target object, it determines that the echo data of the pixel concerned is a sea surface reflection wave.

7. The radar device of claim 1, further comprising:
a color palette having different color information; and a color setting module for setting different color information for each echo kind classified based on the echo kind determination result.

8. The radar device of claim 7, wherein the color setting module further sets a shade according to a level of image data of the pixel concerned based on the echo data.

9. The radar device of claim 1, wherein the behavior determination data is indicative of whether a level of the detected echo data is greater than a predetermined target object detection threshold.

10. The radar device of claim 1, wherein the behavior data is comprised of binary data.

11. An echo data processing device, comprising:
an image data generating module for generating image data based on echo data that is a reflective wave of a detection signal;

a continuity detecting module for detecting a planar continuity of the echo data constituting the image data;

a behavior data generating module for generating behavior data indicative of a time-series behavior of the echo data over a predetermined number of scans of the past; and an echo kind determining module for determining a kind of the echo data based on the planar continuity and the behavior data of the echo data.

12. The echo data processing device of claim 11, wherein the echo kind determining module determines whether the echo data is a stationary target object.

13. The echo data processing device of claim 11, wherein the echo kind determining module determines whether the echo data is a moving target object.

14. The echo data processing device of claim 11, wherein the echo kind determining module determines whether the echo data is an unnecessary wave.

15. The echo data processing device of claim 11, wherein the echo kind determining module determines whether the echo data is a radar interference wave.

16. The echo data processing device of claim 11, wherein the echo kind determining module determines whether the echo data is a sea surface reflection wave.

17. A method of processing echo data, comprising:
generating image data based on echo data that is a reflective wave of a detection signal;

detecting a planar continuity of the echo data constituting the image data;

generating behavior data indicative of a time-series behavior of the echo data over a predetermined number of scans of the past; and determining a kind of the echo data based on the planar continuity and the behavior data of the echo data.

18. The method of processing echo data of claim 17, wherein determining the kind of the echo data includes determining the echo data of a stationary target object first.

19. The method of processing echo data of claim 18, wherein determining the kind of the echo data includes determining the echo data of a moving target object after the determination of the echo data of the stationary target object.

20. The method of processing echo data of claim 19, wherein determining the kind of the echo data includes determining the echo data of a seas surface reflection wave after the determination of the echo data of the stationary target object and the echo data of the moving target object.

* * * * *